United States Patent
Rossi et al.

(10) Patent No.: US 12,246,712 B2
(45) Date of Patent: Mar. 11, 2025

(54) VEHICLE CONSTANT SPEED TRAVEL CONTROL METHOD AND VEHICLE CONSTANT SPEED TRAVEL CONTROL DEVICE

(71) Applicant: Nissan Motor Co., Ltd., Yokohama (JP)

(72) Inventors: Sergio Rossi, Kanagawa (JP); Shuhei Kitta, Kanagawa (JP); Michiharu Gunji, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 265 days.

(21) Appl. No.: 17/642,269

(22) PCT Filed: Oct. 8, 2019

(86) PCT No.: PCT/JP2019/039718
§ 371 (c)(1),
(2) Date: Mar. 11, 2022

(87) PCT Pub. No.: WO2021/070268
PCT Pub. Date: Apr. 15, 2021

(65) Prior Publication Data
US 2022/0297690 A1   Sep. 22, 2022

(51) Int. Cl.
*B60T 8/32* (2006.01)
*B60W 30/14* (2006.01)

(52) U.S. Cl.
CPC ... *B60W 30/143* (2013.01); *B60W 2510/1005* (2013.01); *B60W 2520/10* (2013.01);
(Continued)

(58) Field of Classification Search
CPC ......... B60W 30/143; B60W 2530/203; B60W 2510/1005; B60W 2520/10; B60W 2530/16; B60W 2540/106; B60W 2720/10
See application file for complete search history.

(56) References Cited

U.S. PATENT DOCUMENTS

2001/0032044 A1   10/2001  Hanawa et al.
2009/0023551 A1*  1/2009  Eriksson ............ F16H 61/0213
                                                     477/80
(Continued)

FOREIGN PATENT DOCUMENTS

JP    2001-304384 A    10/2001
JP    2013-129290 A    7/2013
(Continued)

*Primary Examiner* — Adam M Alharbi
(74) *Attorney, Agent, or Firm* — Global IP Counselors, LLP

(57) ABSTRACT

A vehicle constant speed travel control method and device are provided in which a target driving power is calculated based on a difference between a target vehicle speed and a vehicle speed, and then a target accelerator pedal opening for calculating a gear ratio in constant speed travel control is set based on the target driving power. Then, a target gear ratio based on the target accelerator pedal opening and based on a towing state of the vehicle is set where the target gear ratio set higher during towing than during non-towing. The setting of the target accelerator pedal opening is set differently in accordance with the towing state of the vehicle. The setting of the target accelerator pedal opening for calculating the gear ratio to be smaller during towing than the during non-towing with respect to the same target driving power.

6 Claims, 7 Drawing Sheets

(52) U.S. Cl.
    CPC ... *B60W 2530/16* (2013.01); *B60W 2530/203* (2020.02); *B60W 2540/106* (2013.01); *B60W 2720/10* (2013.01)

(56) References Cited

U.S. PATENT DOCUMENTS

2015/0039167 A1      2/2015   Ideshio et al.
2018/0037219 A1*     2/2018   Johri ............... B60W 30/18072
2020/0309042 A1*    10/2020   Otsubo ................ B60W 50/10

FOREIGN PATENT DOCUMENTS

JP          5817506 B2  *  11/2015
WO        2013/084333 A1     6/2013

* cited by examiner

VEHICLE CONSTANT SPEED TRAVEL CONTROL METHOD AND VEHICLE CONSTANT SPEED TRAVEL CONTROL DEVICE

CROSS-REFERENCE TO RELATED APPLICATIONS

This application is a U.S. national stage application of International Application No. PCT/JP2019/039718, filed on Oct. 8, 2019.

BACKGROUND

Technical Field

The present invention relates to a vehicle constant speed travel control method and a vehicle constant speed travel control device.

Background Information

JP2001-304384A discloses a technology for switching between shift maps for a normal running state and a towing running state. A shift line is set on a higher vehicle speed side in a shift map used in a towing running state than in a shift map used in a normal running state, and a characteristic is obtained in which the highest possible gear ratio can be more readily set in the towing running state.

SUMMARY

For example, if the travel path of a vehicle changes from a level road to an uphill road during constant speed travel control, the driving power will become insufficient. Thus, during constant speed travel control, a target accelerator pedal opening for achieving constant speed travel is increased as the vehicle speed decreases. If towing is being performed at this time, the shift map that is used while towing is referenced for shifting.

However, if towing is not taken into consideration for the accelerator pedal opening that is used when a shift map is referenced, the accelerator pedal opening will be larger than the originally targeted accelerator pedal opening in the shift map while towing.

As a result, in this case, the operating point on the shift map passes through a downshift line that is set farther toward the higher vehicle speed side than during non-towing, and there is the risk that a downshift that would not occur during non-towing will occur during towing.

In addition, in this case, in a situation in which there is excess driving power after a transition from an uphill road to a level road, there is the risk that an upshift that would occur during non-towing will not occur during towing.

That is, in this case, there is the risk that an appropriate gear ratio corresponding to the running resistance during constant speed travel control will not be set.

Given the problem described above, the object of the present invention is to set an appropriate gear ratio corresponding to the running resistance during constant speed travel control.

One aspect of the present invention concerns a vehicle constant speed travel control method in which a target driving power is calculated based on the difference between a target vehicle speed and an actual vehicle speed, a target accelerator pedal opening is set based on the target driving power, a target gear ratio is set based on the target accelerator pedal opening and the running resistance, and the target gear ratio is more readily set to a higher gear ratio as the running resistance increases, comprising setting the target accelerator pedal opening differently in accordance with the running resistance, and setting the target accelerator pedal opening to be smaller as the running resistance increases with respect to the same target driving power.

Another aspect of the present invention concerns a vehicle constant speed travel control device corresponding to the vehicle constant speed travel control method is provided.

BRIEF DESCRIPTION OF THE DRAWINGS

Referring now to the attached drawings which form a part of this original disclosure.

DETAILED DESCRIPTION OF EMBODIMENTS

Embodiments of the present invention will be described below with reference to the appended drawings.

Figure 1:
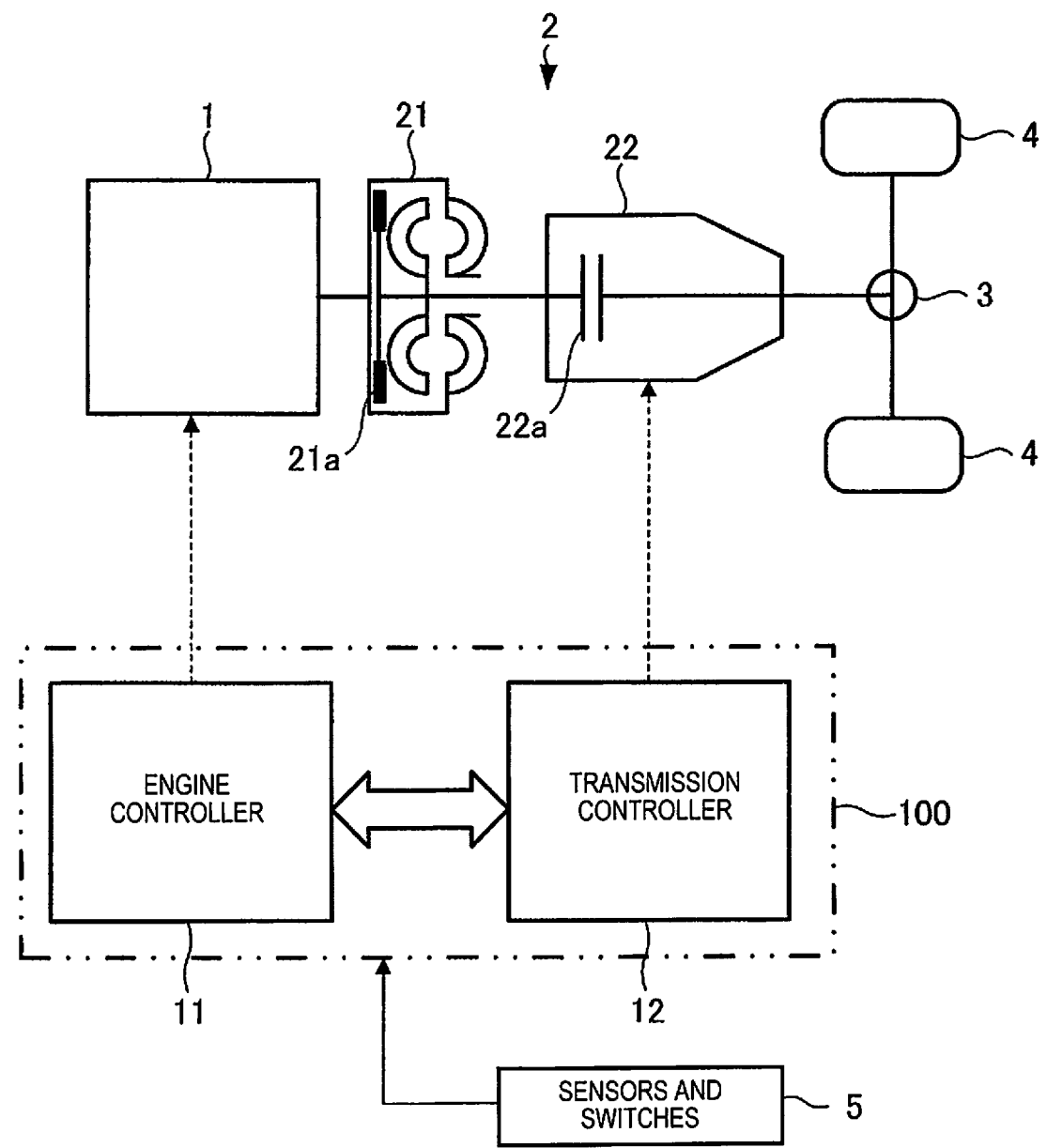
FIG. 1 is a schematic diagram of a vehicle.

FIG. 1 is a schematic diagram of a vehicle. The vehicle comprises an internal combustion engine 1, an automatic transmission 2, a differential gear 3, and drive wheels 4. The internal combustion engine 1 is the drive source, and the power of the internal combustion engine 1 is transmitted to the drive wheels 4 via the automatic transmission 2 and the differential gear 3. Therefore, the automatic transmission 2 is provided in the power transmission path that connects the internal combustion engine 1 and the drive wheels 4.

The automatic transmission 2 is a stepped automatic transmission that carries out shifting by changing the gear ratio in a stepwise manner, and outputs an input rotation at a rotation corresponding to the gear ratio. The gear ratio is a value obtained by dividing the input rotation by the output rotation. An output shaft of the automatic transmission 2 is connected to the drive wheels 4 via the differential gear 3.

The automatic transmission 2 includes a torque converter 21 and an automatic transmission mechanism 22. The torque converter 21 transmits power via a fluid. In the torque converter 21, the power transmission efficiency is enhanced by engagement of a lockup clutch 21a. The automatic transmission mechanism 22 includes a clutch 22a. The clutch 22a is composed of transmission friction elements to be engaged at the current gear shift stage from among the transmission friction elements inside the automatic transmission mechanism 22.

The vehicle further comprises an engine controller 11 and a transmission controller 12. The engine controller 11 controls the internal combustion engine 1, and the transmission controller 12 controls the automatic transmission 2. The engine controller 11 and the transmission controller 12 are connected so as to be capable of communicating with each other. For example, the engine controller 11 and the transmission controller 12 may be connected so as to be capable of communicating with each other via an integrated controller that carries out integrated control of a plurality of controllers.

The engine controller 11 and the transmission controller 12 constitute a controller 100 for carrying out constant speed travel control, which is also referred to as auto cruise control.

Signals from sensors and switches 5, which include a vehicle speed sensor for detecting vehicle speed VSP, that is, the actual vehicle speed, an accelerator pedal opening sensor for detecting accelerator pedal opening APO, an acceleration sensor for detecting the acceleration G, a towing switch for carrying out towing settings, and a steering switch for instructing the execution of constant speed travel control, are input to the controller 100.

Figure 2:
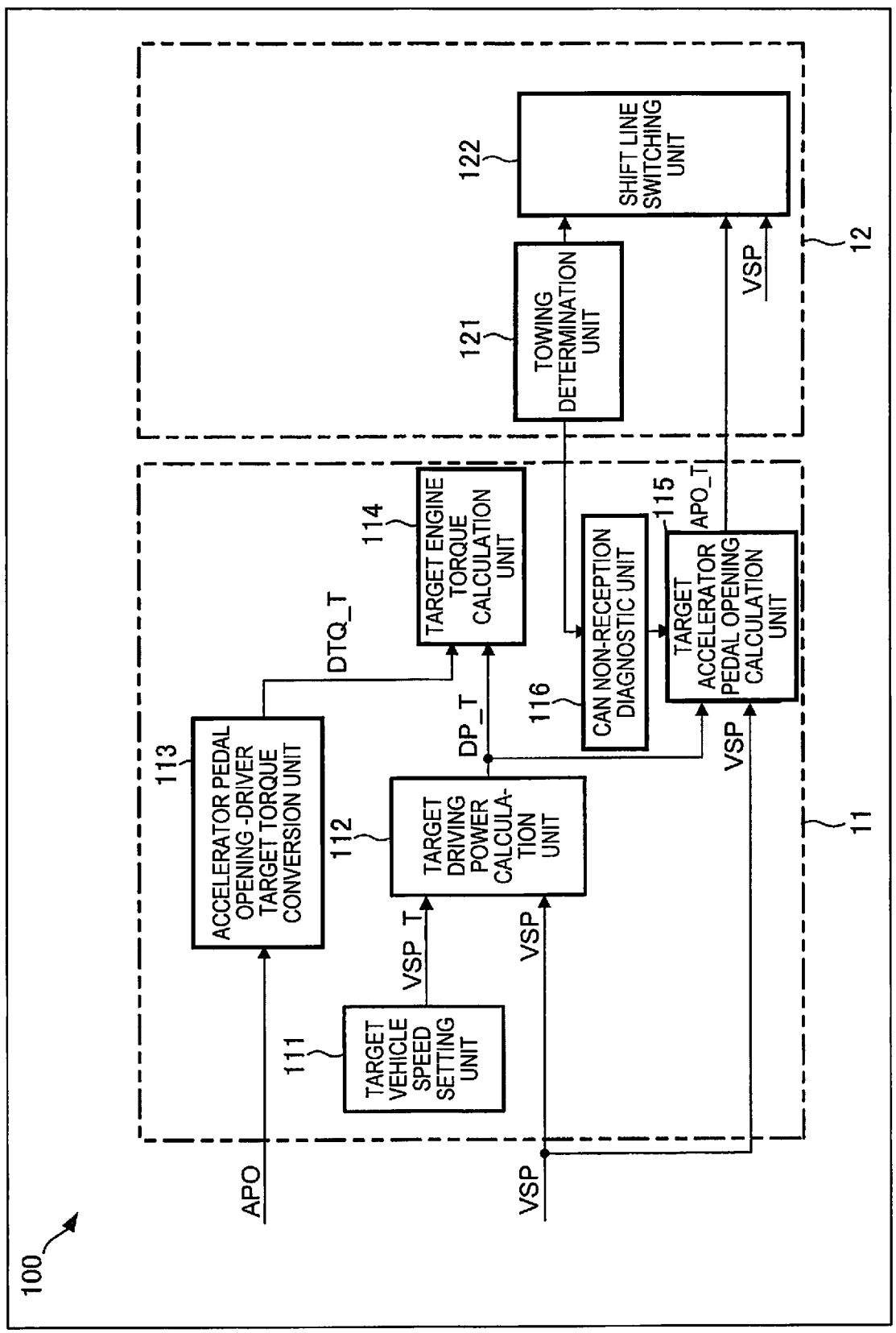
FIG. 2 is a functional block diagram of a controller.

FIG. 2 is a functional block diagram of the controller 100. The engine controller 11 includes a target vehicle speed setting unit 111, a target driving power calculation unit 112, an accelerator pedal opening-driver target torque conversion unit 113, a target driving torque calculation unit 114, a target accelerator pedal opening calculation unit 115, and a CAN non-reception diagnostic unit 116. The transmission controller 12 has a towing determination unit 121 and a shift line switching unit 122. These configurations are functionally realized in the engine controller 11 and the transmission controller 12.

The target vehicle speed setting unit 111 sets a target vehicle speed VSP_T. The target vehicle speed VSP_T is a target vehicle speed for constant speed travel control, and is set in accordance with the operation status of an operating switch, etc., of the constant speed travel control. The set target vehicle speed VSP_T is input to the target driving power calculation unit 112.

The target driving power calculation unit 112 calculates a target driving power DP_T. The target driving power DP_T is a target driving power of the constant speed travel control and is calculated based on the vehicle speed VSP and the target vehicle speed VSP_T as a driving power for controlling the vehicle speed VSP to the target vehicle speed VSP_T, that is, a driving power for achieving the constant speed running state. The calculated target driving power DP_T is input to the target driving torque calculation unit 114 and the target accelerator pedal opening calculation unit 115.

The accelerator pedal opening-driver target torque conversion unit 113 converts the accelerator pedal opening APO to a driver target torque DTQ_T. The calculated driver target torque DTQ_T is input to the target driving torque calculation unit 114.

The target driving torque calculation unit 114 calculates the target engine torque. The target engine torque is the engine torque for achieving the target vehicle speed VSP_T and is calculated based on the target driving power DP_T and the driver target torque DTQ_T. The target engine torque is calculated based on the target driving power DP_T in the constant speed travel control, and, when the driver intends to accelerate, that is, when the driver target torque DTQ_T is greater than zero, the target engine torque is calculated based on the driver target torque DTQ_T. The internal combustion engine 1 is controlled based on the calculated target engine torque.

The target accelerator pedal opening calculation unit 115 calculates a target accelerator pedal opening APO_T. The target accelerator pedal opening APO_T is the target accelerator pedal opening for achieving constant speed travel and is calculated based on the target driving power DP_T and the vehicle speed VSP. The target accelerator pedal opening APO_T is predetermined in map data corresponding to the target driving power DP_T and the vehicle speed VSP. The map data of the target accelerator pedal opening APO_T will be described further below.

The CAN non-reception diagnostic unit 116 diagnoses non-reception of a signal from the transmission controller 12. The CAN non-reception diagnostic unit 116 receives the determination result of the presence or absence of towing, and determines whether towing is taking place. The presence or absence of towing corresponds to the running resistance. The determination result of the presence or absence of towing is input from the CAN non-reception diagnostic unit 116 to the target accelerator pedal opening calculation unit 115.

The towing determination unit 121 determines whether the vehicle is in a towing state based on vehicle weight and a signal from the towing switch. The vehicle weight can be calculated based on the acceleration G and the driving power in the automatic transmission 2, using the relationship F (force)=m (mass)×a (acceleration). The driving power in the automatic transmission 2 can be calculated based on an engine torque signal from the engine controller 11 and the gear ratio (input rotation speed/output rotational speed) that is set for the power transmission path that connects the internal combustion engine 1 and the automatic transmission 2. The determination result of whether the vehicle is in the towing state, that is, the determination result of the presence or absence of towing, is input to the CAN non-reception diagnostic unit 116 and a shift line switching unit 122.

The shift line switching unit 122 calculates a gear shift stage corresponding to the vehicle speed VSP and the target accelerator pedal opening APO_T input from the target accelerator pedal opening calculation unit 115. The gear shift stages are preset in the shift map, and the gear shift stages based on the shift map are indexed to the target gear ratio. The automatic transmission 2 is controlled based on the calculated target gear ratio.

The shift map is preset in accordance with the presence or absence of towing. In the shift line switching unit 122, the shift map is switched in accordance with the presence or absence of towing. As a result, the shift line is switched between the shift line for use during towing and the shift line for use during non-towing, in accordance with the presence or absence of towing. The shift line corresponds to the setting of the target gear ratio.

Figure 3A:
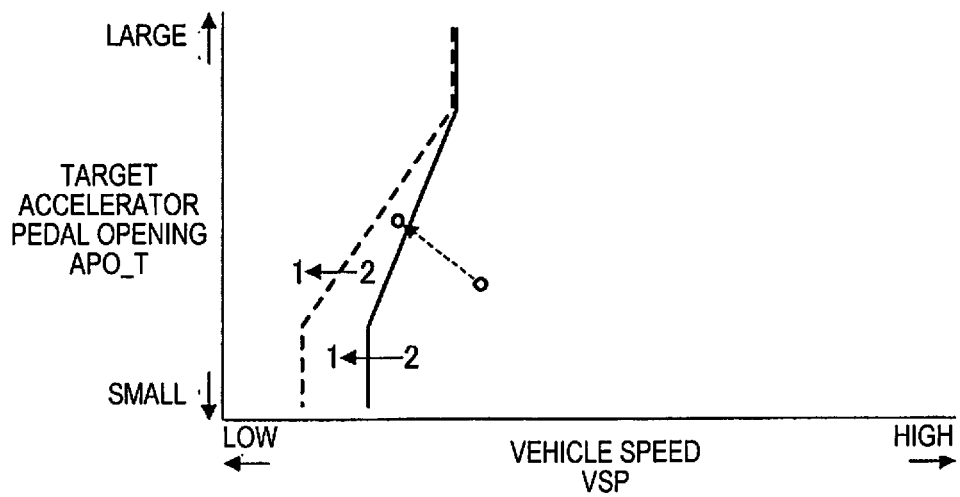
FIG. 3A is a diagram showing one example of downshift lines.
Figure 3B:
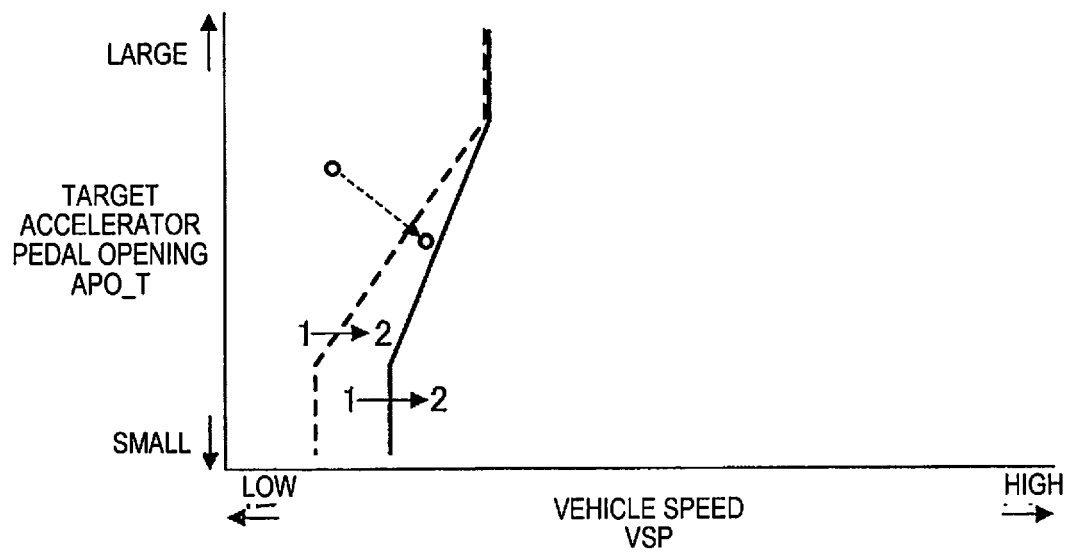
FIG. 3B is a diagram showing one example of upshift lines.

FIGS. 3A and 3B are diagrams illustrating a portion of the shift map. FIG. 3A shows one example of a downshift line, which is a shift line for executing a downshift. FIG. 3B shows one example of an upshift line, which is a shift line for executing an upshift. FIGS. 3A and 3B show cases in which the shift line referred to during towing and the shift line referred to during non-towing are shown on one shift map. The solid line indicates the shift line referred to during towing and the broken line indicates the shift line referred to during non-towing. The shift line referred to during towing and the shift line referred to during non-towing may be composed of separate shift maps.

As shown in FIGS. 3A and 3B, the shift lines are set in advance in accordance with the vehicle speed VSP and the target accelerator pedal opening APO_T, for both the downshift lines and the upshift lines. The shift lines are set to have a section in the middle of the target accelerator pedal opening APO_T where the target accelerator pedal opening APO_T increases as the vehicle speed VSP increases, for both the downshift lines and the upshift lines. In the downshift line, when the vehicle speed VSP decreases or the target accelerator pedal opening APO_T changes to the larger side and crosses the downshift line, the target gear ratio is downshifted from a high-speed stage to a low-speed stage. In the upshift line, when the vehicle speed VSP increases or the target accelerator pedal opening APO_T changes to the smaller side and crosses the downshift line, the target gear ratio is upshifted from a low-speed stage to a high-speed stage.

During towing, as indicated by the solid line, the shift line that is referred to is a shift line that is set on the side on which the vehicle speed VSP is higher, that is, on the side on which the low-speed stage side region increases, as compared to during non-towing, as indicated by the broken line. That is, a low-speed stage (high gear ratio) is more readily set during towing. The slope of the shift line for use during towing, as indicated by the solid line, is less than the slope of the shift line for use during non-towing, as indicated by the broken line. In the region in which the target accelerator pedal opening APO_T is greater than the middle portion, the shift line for use during towing and the shift line for use during non-towing generally coincide with each other.

For example, during constant speed travel control, a downshift is executed when the travel path of the vehicle changes from a level road to an uphill road.

In such a case, when a downshift from second gear to first gear is executed, as shown in FIG. 3A, the downshift will be performed when the vehicle speed VSP is higher during towing than during non-towing. That is, a downshift will occur sooner during towing, when the vehicle weight is relatively high, than during non-towing, when the vehicle weight is relatively low. As a result, the driving power is increased sooner during towing, when the vehicle speed VSP tends to decrease due to insufficient driving power, than during non-towing.

For example, during constant speed travel control, an upshift is carried out when the travel path of the vehicle changes from an uphill road to a level road.

In such a case, when an upshift first gear to second gear is executed during constant speed travel control, as shown in FIG. 3B, the upshift will be performed when the vehicle speed VSP is lower during non-towing than during towing. That is, the upshift will be performed later during towing than during non-towing. As a result, the driving power is decreased later during towing than during non-towing, when the vehicle speed VSP tends to increase due to excess driving power.

On the other hand, there are the following concerns in a vehicle having such a shift map. For example, as described above, if the travel path of a vehicle changes from a level road to an uphill road during constant speed travel control, the driving power will become insufficient. For this reason, the target accelerator pedal opening APO_T is increased as the vehicle speed VSP decreases in constant speed travel control. If towing is being carried out at this time, a shift map that is used during towing, that is, the solid shift line shown in FIG. 3A, is referenced for shifting.

However, if towing is not taken into consideration in the target accelerator pedal opening APO_T used when the shift map is referenced, that is, if the target accelerator pedal opening APO_T is unchanged from that for non-towing, the target accelerator pedal opening APO_T in the shift map will be higher than the originally targeted accelerator pedal opening APO during towing.

As a result, in this case, as shown in FIG. 3A, the operating point on the shift map passes through a downshift line that is set farther on the high vehicle speed side than during non-towing, thereby creating the risk that a downshift that would not have occurred during non-towing will occur during towing.

In addition, in this case, in a situation in which there is excess driving power after a transition from an uphill road to a level road, the operating point on the shift map does not pass through the solid upshift line, as shown in FIG. 3B, so that there is the concern that an upshift that would have occurred during non-towing does not occur during towing.

That is, in this case, it is possible that an appropriate gear ratio corresponding to the presence or absence of towing during constant speed travel control may not be set.

In view of such considerations, the controller 100 of the present embodiment carries out the control described below.

Figure 4:
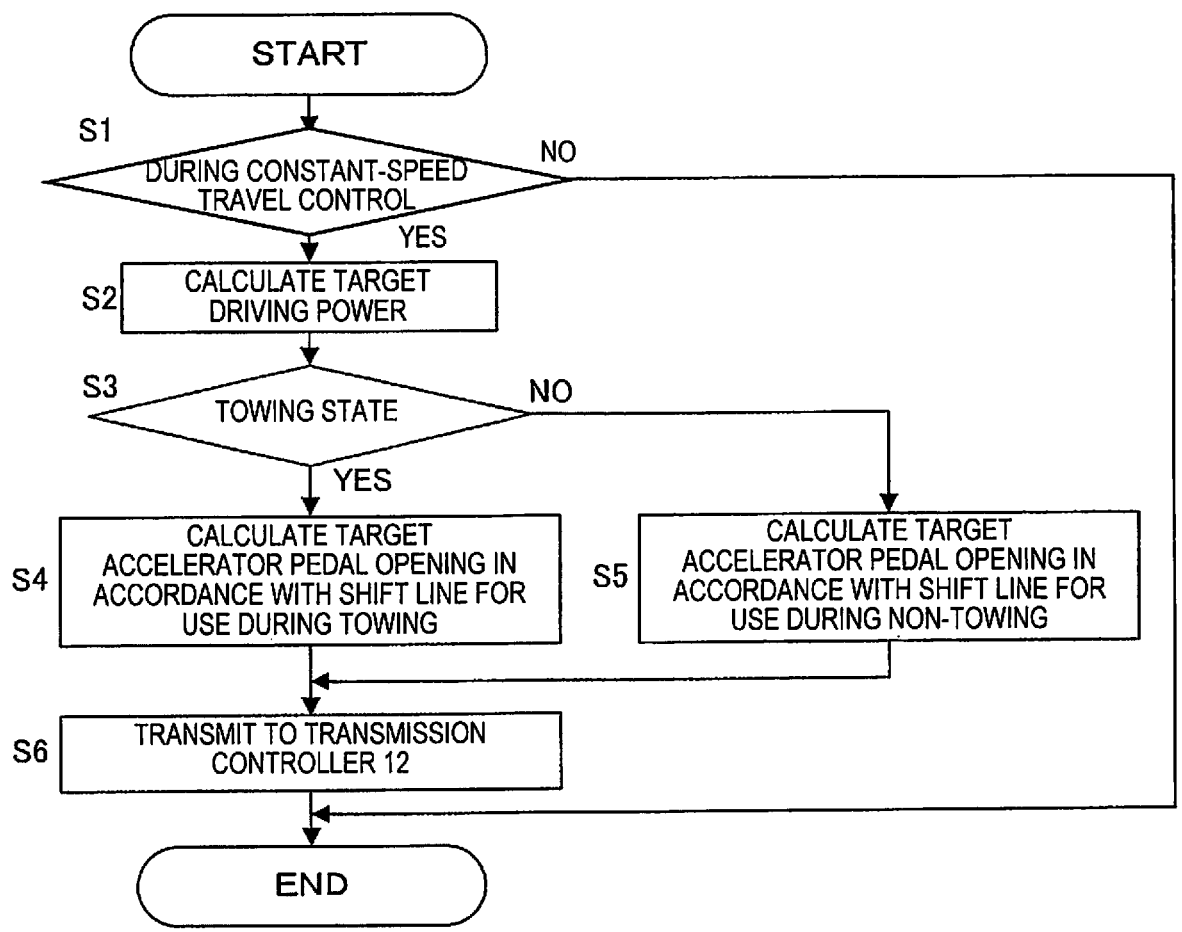
FIG. 4 is a flowchart showing one example of a control process carried out by a controller.

FIG. 4 is a flowchart showing one example of the control carried out by the controller 100. The process shown in FIG. 4 is carried out by the engine controller 11. The controller 100, including the engine controller 11, is programmed to execute the process of the flowchart shown in FIG. 4, and is thus configured to have a control unit.

In Step S1 the engine controller 11 determines whether constant speed travel control is in progress. Whether or not constant speed travel control is in progress can be determined based on a flag indicating the presence or absence of the execution of constant speed travel control. In the case of a negative determination in Step S1, the process is temporarily ended. In the case of a positive determination in Step S1, the process proceeds to Step S2.

In Step S2 the engine controller 11 calculates the target driving power DP_T. The target driving power DP_T is calculated based on the vehicle speed VSP and the target vehicle speed VSP_T.

In Step S3 the engine controller 11 determines whether it is in a towing state. The determination of whether it is in a towing state is carried out by the engine controller 11 when the CAN non-reception diagnostic unit 116 receives a determination result from the towing determination unit 121. The determination of whether it is in the towing state can be understood as being carried out by the transmission controller 12 included in the controller 100. In the case of a positive determination in Step S3, the process proceeds to Step S4; and in the case of a negative determination in Step S3, the process proceeds to Step S5.

The engine controller 11 calculates, in Step S4, the target accelerator pedal opening APO_T corresponding to the shift line for use during towing and, in Step S5, the target accelerator pedal opening APO_T corresponding to the shift line for use during non-towing. In Step S6, the target accelerator pedal opening APO_T calculated in Step S4 or Step S5 is then transmitted to the transmission controller 12 and shifting is executed in accordance with the transmitted target accelerator pedal opening APO_T. The process is stopped temporarily after Step S6.

The target accelerator pedal opening APO_T calculated in Steps S4 and S5 is preset in the map data in accordance with the presence or absence of towing. In Steps S4 and S5 the target accelerator pedal opening APO_T is calculated by referencing the map data of the target accelerator pedal opening APO_T, explained below.

Figure 5:
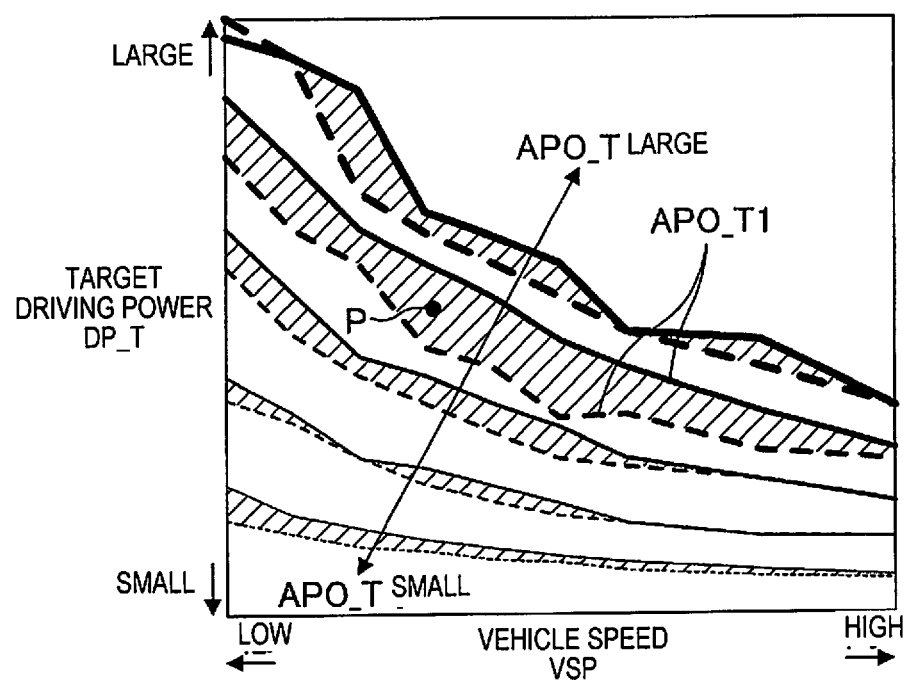
FIG. 5 is a diagram showing one example of map data of a target accelerator pedal opening.

FIG. 5 is a diagram showing one example of the map data of the target accelerator pedal opening APO_T. FIG. 5 shows a case in which the target accelerator pedal opening APO_T referred to during towing and the target accelerator pedal opening APO_T referred to during non-towing are represented by one item of map data. The solid line indicates the target accelerator pedal opening APO_T referred to during towing. The broken line indicates the target accelerator pedal opening APO_T referred to during non-towing.

The target accelerator pedal opening APO_T indicated by the solid line is an opening degree in accordance with the shift line for use during towing, that is, the shift line indicated by the solid lines in FIGS. 3A and 3B. In addition, the target accelerator pedal opening APO_T indicated by the broken line is an opening degree in accordance with the shift line for use during non-towing, that is, the shift line indicated by the broken lines in FIGS. 3A and 3B. The target accelerator pedal opening APO_T referred to during towing and the target accelerator pedal opening APO_T referred to during non-towing may be composed of separate map data. The target accelerator pedal opening APO_T that is referred to is switched between the solid line and the broken line in accordance with the presence or absence of towing in the above-described target accelerator pedal opening calculation unit 115.

The solid lines and the broken lines indicate contour lines of the target accelerator pedal opening APO_T, and the thicker lines indicate larger target accelerator pedal openings APO_T. For both the solid lines and the broken lines, the target accelerator pedal opening APO_T is set larger as the vehicle speed VSP increases and the target driving power DP_T increases. The referenced target accelerator pedal opening APO_T corresponds to the setting for the target accelerator pedal opening APO_T. The map data of the target accelerator pedal opening APO_T may be understood as corresponding to the setting of the target accelerator pedal opening APO_T.

When the target accelerator pedal opening APO_T is the same, that is, when the solid line and the broken line are the same size, the target driving power DP_T during towing as indicated by the solid line is generally set to be larger, at the same vehicle speed VSP, than the target driving power DP_T during non-towing as indicated by the broken line.

In other words, the setting of the target accelerator pedal opening APO_T has an opening degree in which the target driving power DP_T is set higher, at the same vehicle speed VSP, at least in some of the vehicle speed regions, during towing as indicated by the solid line, than during non-towing as indicated by the broken line.

When the target accelerator pedal opening APO_T is a prescribed opening degree APO_T1, the target driving power DP_T during towing as indicated by the solid line is set higher, at the same vehicle speed VSP, than the target driving power DP_T during non-towing as indicated by the broken line.

In other words, the setting of the target accelerator pedal opening APO_T is done so as to have an opening degree APO_T1 in which the target driving power DP_T is set higher, at the same vehicle speed VSP, at least in some of the vehicle speed regions, during towing as indicated by the solid line, than during non-towing as indicated by the broken line.

In the map data set in this manner, the target accelerator pedal opening APO_T is calculated based on an operating point P corresponding to the vehicle speed VSP and the target driving power DP_T, both during towing and non-towing.

For example, the target accelerator pedal opening APO_T corresponding to the operating point P in the position shown is smaller than the accelerator pedal opening APO_T1 during towing and larger than the prescribed accelerator pedal opening APO_T1 during non-towing. Therefore, in this case, a smaller target accelerator pedal opening APO_T is calculated during towing than during non-towing.

The hatched regions are regions sandwiched between two target accelerator pedal openings APO_T of the same size during towing and non-towing. If the operating point P corresponding to the vehicle speed VSP and the target driving power DP_T is in a wide hatched region, the difference between the target accelerator pedal opening APO_T during towing and the target accelerator pedal opening APO_T during non-towing becomes large.

The target accelerator pedal opening APO_T indicated by the solid line and the broken line is set such that the mode of shifting in accordance with the presence or absence of towing becomes the same during towing and non-towing, such as being set such that shifting that does not occur during non-towing does not occur during towing.

In such map data of the target accelerator pedal opening APO_T, the target accelerator pedal opening APO_T is set to be smaller during towing than during non-towing, with respect to the same operating point P.

Towing corresponds to a first case in which the running resistance is relatively high, and non-towing corresponds to a second case in which the running resistance is relatively low in comparison to the towing state.

As described above, according to the map data of the target accelerator pedal opening APO_T shown in FIG. 5, a smaller target accelerator pedal opening APO_T is calculated during towing than during non-towing. As a result, shifting of the automatic transmission 2 during towing is carried out in the following manner.

Figure 6A:
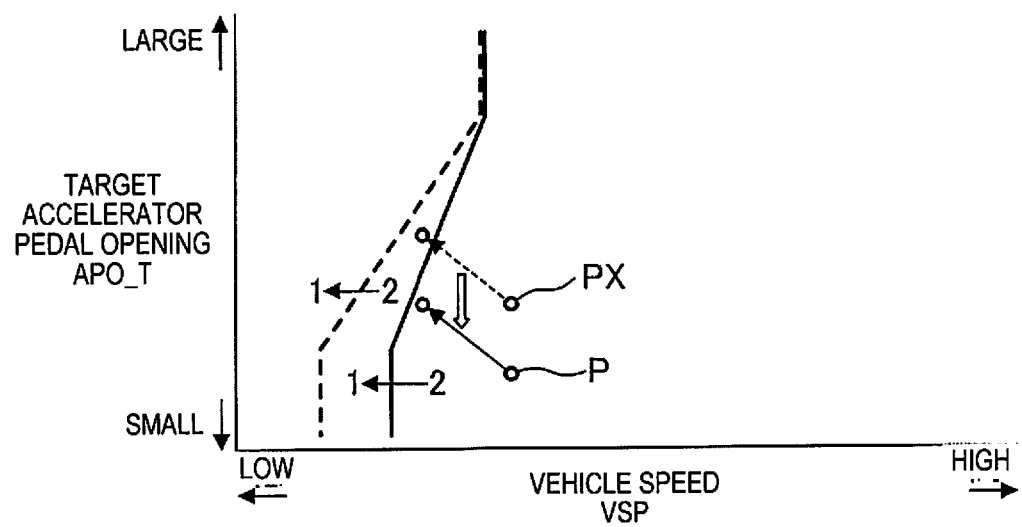
FIG. 6A is a first explanatory diagram of a gear ratio setting carried out during towing.
Figure 6B:
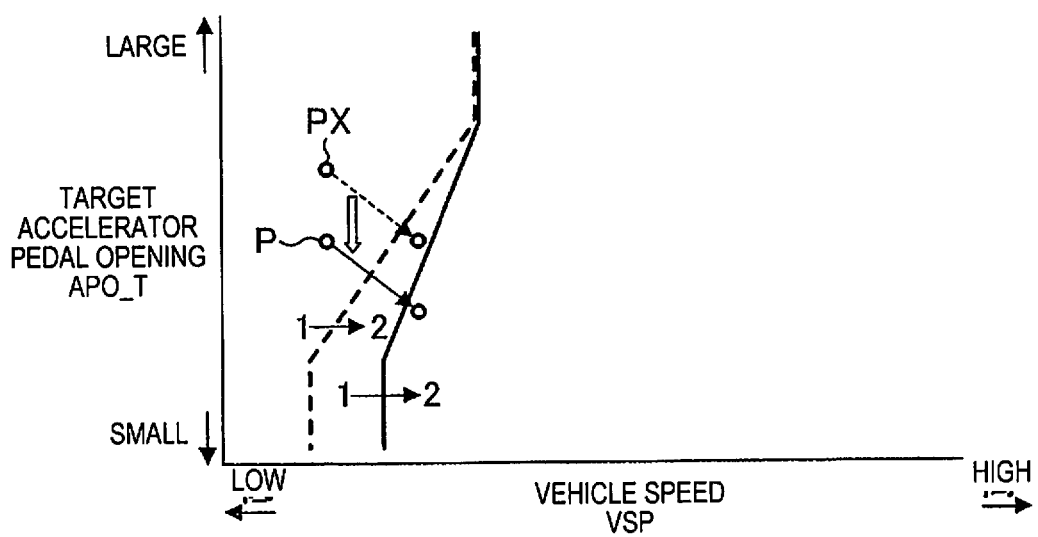
FIG. 6B is a second explanatory diagram of a gear ratio setting carried out during towing.

FIGS. 6A and 6B are explanatory diagrams of the gear ratio setting carried out during towing. FIG. 6A indicates a case in which the travel path changes from a level road to an uphill road. FIG. 6B indicates a case in which the travel path changes from an uphill road to a level road. In FIGS. 6A and 6B, the solid shift lines indicate the shift lines during towing, and the broken shift lines indicate the shift lines during non-towing. The operating point PX shows a case of a comparative example. The comparative example shows a case in which the target accelerator pedal opening APO_T does not take towing into consideration, that is, a case in which the target accelerator pedal opening APO_T is the same as that during non-towing.

As shown in FIG. 6A, if the travel path changes from a level road to an uphill road, the operating point P and the operating point PX both move such that the target accelerator pedal opening APO_T increases as the vehicle speed VSP decreases by means of constant speed travel control. In the case of the comparative example, during non-towing, because even if the operating point PX moves, it does not pass through the downshift line, indicated by the broken line, a downshift does not occur. However, during towing, the downshift line indicated by the solid line is referred to, so that in the case of the comparative example, a downshift from second gear to first gear, which does not occur during non-towing, occurs during towing.

In the case of the present embodiment, the operating point P is located on the side where the target accelerator pedal opening APO_T is smaller at the same vehicle speed VSP than the operating point PX. That is, during towing, the target accelerator pedal opening APO_T is set smaller than during non-towing. For this reason, during towing, even if the operating point P moves, it does not pass through the downshift line indicated by the solid line, so that a downshift from the second gear to the first gear does not occur during towing, in the same manner as during non-towing.

As shown in FIG. 6B, if the travel path changes from an uphill road to a level road, both the operating point P and the operating point PX move to the side on which the target accelerator pedal opening APO_T becomes smaller as the vehicle speed VSP increases by means of constant speed travel control. In the case of the comparative example, during non-towing, the operating point PX passes through the upshift line, indicated by the broken line, and an upshift from first gear to second gear occurs. However, during towing the upshift line indicated by the solid line is referenced; therefore, in the case of the comparative example, an upshift from first gear to second gear, which should occur during non-towing, does not occur.

In the case of the present embodiment, during towing, the target accelerator pedal opening APO_T is set smaller than during non-towing, therefore, the operating point P passes through the downshift line indicated by the solid line. As a result, in the same manner as during non-towing, an upshift from first gear to second gear occurs during towing.

Figure 7:
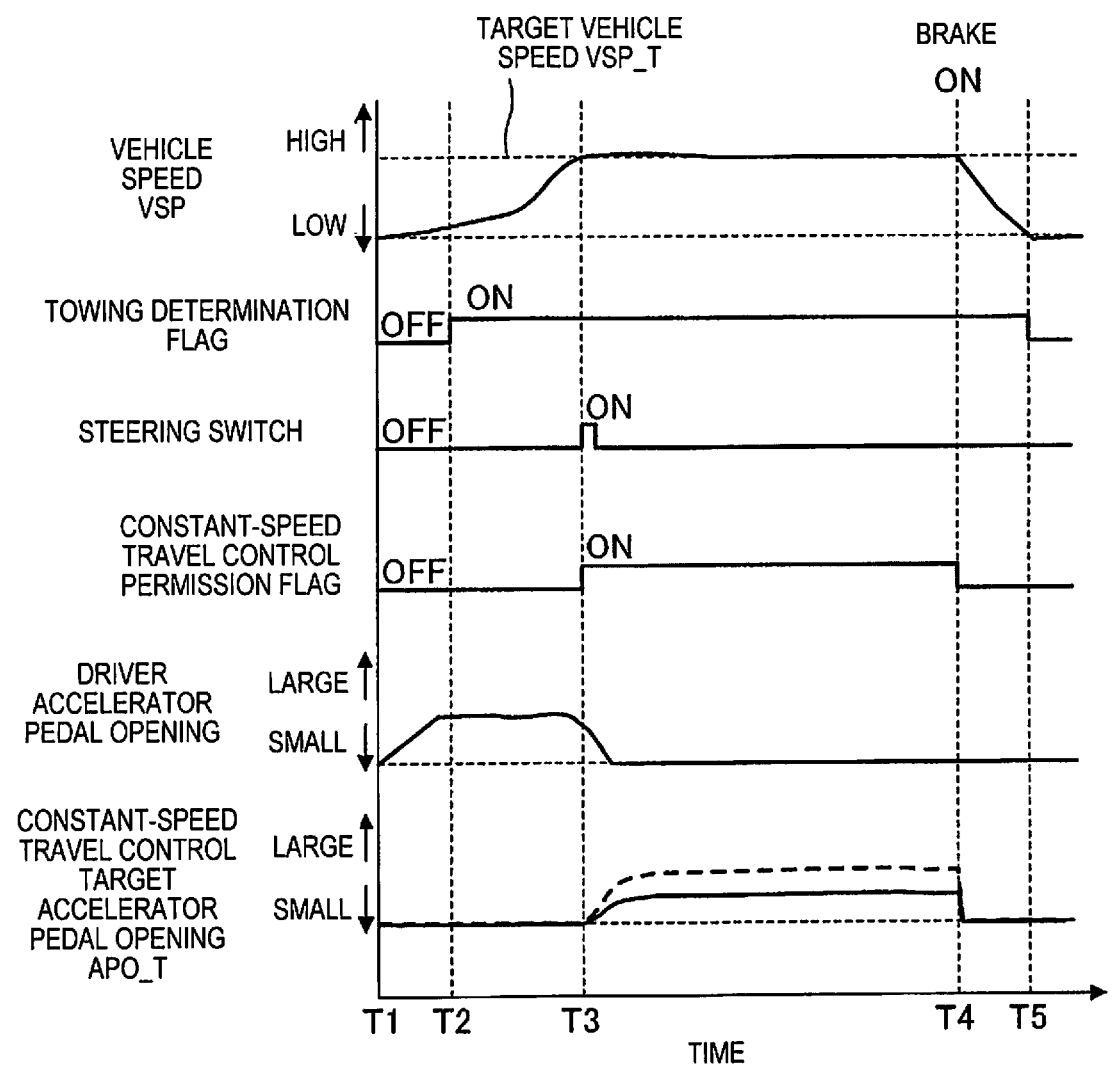
FIG. 7 is a diagram showing one example of a timing chart.

Next, one example of the timing chart corresponding to the flow chart shown in FIG. 5 will be described using FIG. 7. The target accelerator pedal opening APO_T indicated by the broken line indicates the target accelerator pedal opening APO_T calculated during non-towing.

At timing T1, constant speed travel control is not executed, and the vehicle starts in accordance with the depression of the accelerator pedal by the driver. As a result, the driver accelerator pedal opening, which is the accelerator pedal opening APO based on an operation from the driver, starts to increase, and the vehicle speed VSP starts to increase.

At timing T2, it is determined to be in the towing state, so that a towing determination flag is turned ON.

At timing T3, a steering switch for issuing an instruction fort constant speed travel control is turned ON, and a constant speed travel control permission flag is turned ON. As a result, the target accelerator pedal opening APO_T of the constant speed travel control starts to increase. The driver accelerator pedal opening decreases in accordance with the driver operation.

From timing T3, the vehicle speed VSP is controlled to become the target vehicle speed VSP_T by means of the constant speed travel control. At this time, the target accelerator pedal opening APO_T is set smaller during towing than during non-towing, as indicated by the broken line. As a result, the gear ratio is appropriately set in accordance with the presence or absence of towing.

At timing T4, the brake is turned ON by a driver operation. As a result, the vehicle speed VSP starts to decrease and the constant speed travel control permission flag is turned OFF. In addition, the target accelerator pedal opening APO_T becomes zero.

At timing T5, the vehicle speed VSP becomes zero, and the towing determination flag is turned OFF. This is because the driver may disable towing while the vehicle is stopped.

Next, the main action and effects of the present embodiment will be described.

The vehicle constant speed travel control method according to the present embodiment is a vehicle constant speed travel control method in which the target driving power DP_T is calculated based on the difference between the target vehicle speed VSP_T and the vehicle speed VSP, the target accelerator pedal opening APO_T is set based on the target driving power DP_T, a gear shift stage based on a shift map is set based on the target accelerator pedal opening APO_T and the presence or absence of towing (running resistance), and the gear shift stage is more readily set to a low-speed stage (high gear ratio) during towing (as the running resistance increases), wherein the referenced target accelerator pedal opening APO_T is set differently in accordance with the presence or absence of towing (running resistance), and the target accelerator pedal opening APO_T is set smaller during towing (as the running resistance becomes greater) with respect to the same target driving power DP_T.

By means of such a method, in a state in which the driving power is insufficient during constant speed travel control, it becomes possible to prevent a downshift that does not occur during non-towing from occurring during towing. In addition, in a situation in which there is excess driving power during constant speed travel control, it becomes possible for an upshift that should occur during non-towing to occur during towing. Therefore, by means of such a method, it becomes possible to set an appropriate gear ratio in accordance with presence or absence of towing during constant speed travel control.

In the vehicle constant speed travel control method according to the present embodiment, the target accelerator pedal opening APO_T to be referenced is made different in accordance with the setting of the shift line corresponding to the presence or absence of towing.

By means of such a method, the mismatch between the target accelerator pedal opening APO_T calculated by the engine controller 11 during towing, and the gear shift stage based on the shift map calculated by the transmission controller 12 during towing, can be suppressed. For this reason, it becomes possible to set an appropriate gear ratio in accordance with the presence or absence of towing.

In the vehicle constant speed travel control method according to the present embodiment, the target accelerator pedal opening APO_T is calculated based on the vehicle speed VSP and the target driving power DP_T. The target accelerator pedal opening APO_T that is referenced during towing is set so that the target accelerator pedal opening APO_T becomes smaller with respect to the same operating point P than during non-towing.

By means of such a method, the target accelerator pedal opening APO_T calculated during towing and the gear shift stage based on the shift map can be made to suitably correspond to each other, thereby making it possible to set a suitable gear ratio in accordance with the presence or absence of towing.

In the vehicle constant speed travel control method according to the present embodiment, the running resistance is used to determine the presence or absence of towing, and the determination result of the presence or absence of towing used for switching the shift line is used for switching that target accelerator pedal opening APO_T to be referenced.

By means of such a configuration, the switching of the target accelerator pedal opening APO_T that is referenced can be matched to the switching of the shift line. For this reason, the target accelerator pedal opening APO_T calculated during towing and the gear shift stage based on the shift map can be made to more suitably correspond to each other.

In the vehicle constant speed travel control method according to the present embodiment, the shift line is set in accordance with the vehicle speed VSP and the target accelerator pedal opening APO_T, the shift line has a section in which the target accelerator pedal opening APO_T increases as the vehicle speed VSP increases, the gear shift stage is changed when the vehicle speed VSP or the target accelerator pedal opening APO_T crosses the shift line, there is a plurality of shift lines in accordance with the running resistance, and the shift line is set on the higher vehicle speed side as the running resistance increases. As a result, in a case in which the shift line, which is set in accordance with the vehicle speed VSP and the target accelerator pedal opening APO_T, has a slope, the target accelerator pedal opening is changed in accordance with the presence or absence of towing, thereby making it possible to appropriately execute downshifting and upshifting.

Embodiments of the present invention were described above, but the above-described embodiments illustrate only some of the application examples of the present invention, and are not intended to limit the technical scope of the present invention to the specific configurations of the above-described embodiments.

In the above-described embodiment, a case in which the presence or absence of towing corresponds to the running resistance is described. However, the running resistance may be the road surface gradient of a travel path. Even in this case, in a situation in which there is insufficient or excess driving power in accordance with the road surface gradient during constant speed travel control, it becomes possible to set an appropriate gear ratio.

In the embodiment described above, a case in which the control unit and the vehicle constant speed travel control method are realized by the controller 100 was described. However, the control unit and the vehicle constant speed travel control method may be realized by a single controller.

The invention claimed is:

1. A vehicle constant speed travel control method comprising executing the following operations during a constant speed travel control of a vehicle:
   calculating a target driving power for the vehicle based on a difference between a target vehicle speed and an actual vehicle speed;
   setting a target accelerator pedal opening to be used for calculating a gear ratio in accordance with the actual vehicle speed, the target accelerator pedal opening being set based on the target driving power;
   determining whether the vehicle is in a towing state or a non-towing state;
   selecting a towing-state shift line or a non-towing-state shift line in accordance with the towing state or the non-towing state that was determined, each of the towing state-shift line and the non-towing state shift line depicting a relationship of the target accelerator pedal opening with respect to the actual vehicle speed, the towing-state shift line being different from the non-towing-state shift line, and
   setting a target gear ratio based on the target accelerator pedal opening and the actual vehicle speed by using the towing-state shift line or the non-towing-state shift line that was selected, the target gear ratio being set to a higher gear ratio when the vehicle is in the towing state than when the vehicle is in the non-towing state, wherein
   for the same target driving power, the target accelerator pedal opening is set to be smaller when the vehicle is in the towing state than when the vehicle is in the non-towing state.

2. The vehicle constant speed travel control method according to claim 1, wherein
the target accelerator pedal opening is set based on the target driving power, the actual vehicle speed, and the running resistance.

3. The vehicle constant speed travel control method according to claim 1, wherein
each of the towing-state shift line and the non-towing-state shift line has a section in which the target accelerator pedal opening increases as the actual vehicle speed increases, the target gear ratio being changed when the actual vehicle speed or the target accelerator pedal opening crosses the towing-state shift line or the non-towing-state shift line that was selected.

4. A vehicle constant speed travel control device comprising:
   a control unit configured to execute the following operations during a constant speed travel control of a vehicle:
   calculate a target driving power for the vehicle based on a difference between a target vehicle speed and an actual vehicle speed,
   set a target accelerator pedal opening to be used for calculating the gear ratio in accordance with the actual vehicle speed, the target accelerator pedal opening being set based on the target driving power,
   determine whether the vehicle is in a towing state or a non-towing state,
   select a towing-state shift line or a non-towing-state shift line in accordance with the towing state or the non-towing state that was determined, each of the towing state-shift line and the non-towing state shift line depicting a relationship of the target accelerator pedal opening with respect to the actual vehicle speed, the towing-state shift line being different from the non-towing-state shift line, and
   set a target gear ratio based on the target accelerator pedal opening and the actual vehicle speed by using the towing-state shift line or the non-towing-state shift line that was selected, the target gear ratio being set to a higher gear ratio when the vehicle is in the towing state than when the vehicle is in the non-towing state,
   for the same target driving power, the target accelerator pedal opening being set smaller when the vehicle is in the towing state than when the vehicle is in the non-towing state.

5. The vehicle constant speed travel control device according to claim 4, wherein
the towing state-shift line and the non-towing state shift line are configured such that, in a low vehicle speed region, a value of the actual vehicle speed at which shifting occurs during the towing state is higher than a value of the actual vehicle speed at which shifting occurs during the non-towing state.

6. The vehicle constant speed travel control method according to claim 1, wherein
the towing state-shift line and the non-towing state shift line are configured such that, in a low vehicle speed region, a value of the actual vehicle speed at which shifting occurs during the towing state is higher than a value of the actual vehicle speed at which shifting occurs during the non-towing state.

\* \* \* \* \*